United States Patent Office 3,545,201
Patented Dec. 8, 1970

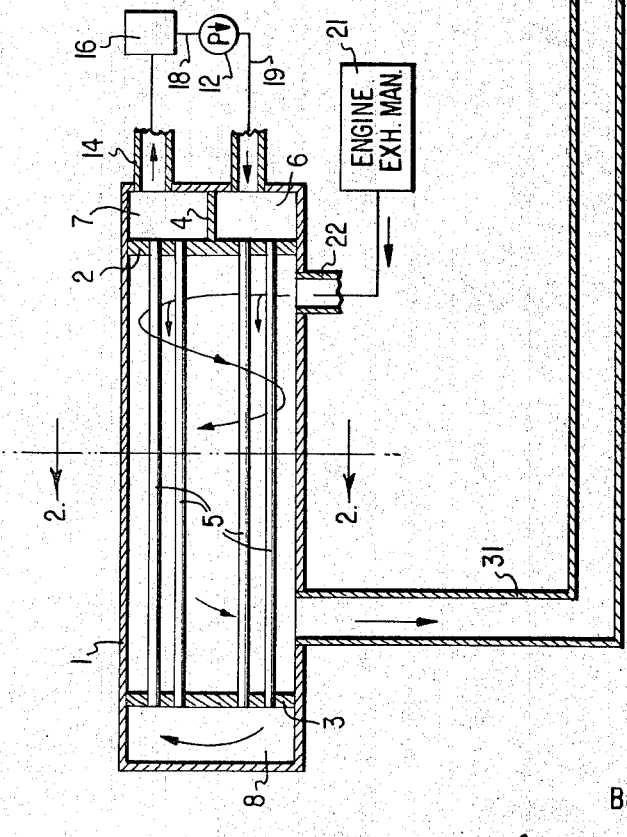
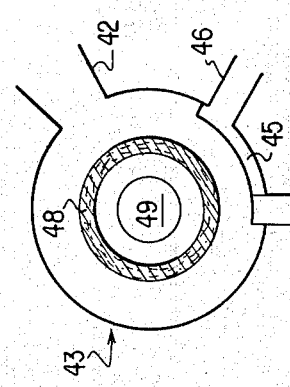

3,545,201
EXHAUST GAS TREATMENT
Bjarne Pedersen, Industry, Maine
(P.O. Box 528, Farmington, Maine 04938)
Continuation-in-part of application Ser. No. 788,309, Dec. 31, 1968, which is a continuation-in-part of application Ser. No. 656,261, July 26, 1967. This application Aug. 22, 1969, Ser. No. 852,437
Int. Cl. F01n 3/10; F02m 31/08
U.S. Cl. 60—30
6 Claims

ABSTRACT OF THE DISCLOSURE

An exhaust gas treatment system connected between the exhaust manifold and the carburetor air intake housing of an engine and arranged for treating the gas issuing from the exhaust manifold by reacting it with additional air to burn carbon monoxide and unburned hydrocarbons, passing the resulting gas through a filter, and then delivering the remaining gas through the carburetor air intake housing from where it exits into the atmosphere.

CROSS REFERENCE TO RELATED APPLICATION

This is a continuation-in-part of my copending application Ser. No. 788,309, filed on Dec. 31, 1968, which was itself a continuation-in-part of my application Ser. No. 656,261, filed on July 26, 1967, both now abandoned.

BACKGROUND OF THE INVENTION

The present invention relates to exhaust gas treatment, and particularly to a system for preventing noxious exhaust products from escaping into the atmosphere.

It is well known that the exhaust gases from internal-combustion engines contain many noxious products which are harmful to plant and animal life and that, as the number of automotive vehicles has increased, the introduction of large concentrations of these noxious products into the atmosphere has contributed substantially to the air pollution prevalent in urban areas.

Many arrangements and techniques have already been proposed for alleviating this problem. For example, it has already been suggested to remove the noxious exhaust products by subjecting the exhaust gas to a catalytic treatment before expelling the gas to the atmosphere. Techniques of this type have the drawbacks, however, that there are still some undesirable products in the gas passing to the atmosphere and that the catalyst employed is usually expensive and requires frequent renewal.

Another technique involves the passages of the exhaust gas through a body of water for initially cooling the gas and removing the solid constituents therefrom. This is accompanied by a settling of the solid products to the bottom of the water body. In addition to the fact that this technique requires the frequent removal of the collected solids from the bottom of the liquid container, it also requires the provision of a relatively large water body and hence is not satisfactory for use on passenger vehicles of normal size.

Other techniques involve subjecting the exhaust gas to a liquid spray for the purpose of cooling it, these techniques involving a relatively complex liquid spray and circulating system. Moreover, much of the liquid is entrained by the gas and expelled to the atmosphere therewith, so that the system requires frequent replenishment of the spray liquid.

Other techniques which have been proposed create a substantial back pressure which interfers with the smooth running of the engine.

SUMMARY OF THE INVENTION

It is a primary object of the present invention to overcome these drawbacks and difficulties.

Another object of the present invention is to treat exhaust gases so as to eliminate substantially all the noxious components thereof.

A further object of the present invention is to prevent the escape of harmful exhaust gases to the atmosphere.

Yet another object of the present invention is to provide an exhaust gas treatment system which is relatively compact and inexpensive.

A still further object of the present invention is to provide an exhaust gas treatment system requiring little maintenance.

Another object of the invention is to provide an exhaust gas treatment system which produces a minimum back pressure.

These and other objects according to the present invention are achieved by the provision of a novel exhaust gas treatment system for an automotive vehicle having a carburetor air intake and an engine exhaust manifold. The system according to the present invention includes reactor means defining a gas treatment region and having a gas inlet connectable to the exhaust manifold and a gas outlet, gas deflector means disposed in the reactor means for imparting a turbulent movement to the exhaust gas entering the reactor means via the reactor means, and air delivery means connected to the reactor means for delivering the air into the gas treatment region whereby the air combines with the exhaust gas to burn carbon monoxide and unburned hydrocarbons. The system according to the invention further includes filter means connected to the gas outlet for filtering combustion products out of the gas leaving the reactor means, and conduit means connected to the filter means for conducting all residual gas to the atmosphere.

BRIEF DESCRIPTION OF THE DRAWINGS

FIG. 1 is an elevational view, partly in cross section and partly diagrammatic, of a preferred embodiment of the present invention.

FIG. 2 is a cross-sectional view along the line 2—2 of FIG. 1.

DESCRIPTION OF THE PREFERRED EMBODIMENTS

FIGS. 1 and 2 of the drawings show a complete exhaust gas treatment system according to the present invention which is designed to be mounted on an automotive vehicle and which can be made sufficiently small to take up no more room than the usual muffler assembly provided on such a vehicle. In addition, since, as will be discussed in detail below, the exhaust treatment system according to the present invention expels only a small amount of harmless gas to the atmosphere, the tail pipe normally associated with automotive exhaust systems is eliminated.

The exhaust treatment system is composed essentially of a reactor, or container 1 whose interior is provided with two transverse partition walls 2 and 3 and a diametrically extending dividing wall 4, the walls 2 and 4 dividing the right-hand end of the container 1 into a cooling fluid inlet fluid inlet chamber 6 and a cooling fluid outlet chamber 7. The left-hand wall 3 defines a cooling fluid return chamber 8. Between walls 2 and 3 are disposed a plurality of fluid-conducting tubes 5, the tubes extending through openings in the walls 2 and 3 to place the chambers 6 and 7 in communication with the chamber 8. Tubes 5 serve as deflectors for imparting a turbulent movement to the gas introduced into the container.

Connected to container 1 is an inlet pipe 22 whose outlet end is in communication with the region of chamber 1 between walls 2 and 3, the inlet end of pipe 22 being connected to the engine exhaust manifold 21 to conduct all of the exhaust gas produced by the engine to container 1. An exhaust gas outlet pipe 31 is connected to container 1 so as to also be in communication with the chamber region between walls 2 and 3. The general flow path of exhaust gas through this region is indicated by arrows.

As shown in FIG. 2, an air jet nozzle 9 is also mounted in the wall of container 1 so as to deliver a jet of air into the region traversed by the exhaust gas. Nozzle 9 is supplied with air by a separate pump 10 connected to the nozzle by a conduit 11. The pump is preferably arranged to be driven by the fan belt of the engine whose exhaust is being treated and can be of the type used for automobile air conditioning systems.

The device according to the present invention further includes a circulating system for the cooling fluid and essentially includes a pump 12 and a cooling device 16. The chamber 7 is connected to the cooling device 16 by a pipe 14, while the device 16 is in turn connected to the pump 12 by a pipe 18. In addition, the container 1 is provided with a coolant inlet pipe 19 having one end connected to the pump 12 and the other end connected to chamber 6.

The pump 12 is preferably arranged to pump liquid in a direction from cooling device 16 to chamber 6, although the coolant could also be pumped in the reverse direction.

The liquid coolant filling the cooling system may be constituted by any suitable heat-absorbing substance, such as, for example, a mixture composed of 60% ethylene glycol and 40% water. The cooling device may be constituted by any suitable heat-dissipating unit, and may be in the form of a radiator disposed in front of the radiator normally provided for the engine cooling system.

Alternatively, the cooling system may be connected directly into the engine cooling system and may use the engine cooling system water as the liquid coolant. This arrangement is preferred because it is well suited for smaller automotive vehicles such as passenger cars. In this case, pump 12 is the cooling system pump and cooling device 16 is the automobile radiator.

The outlet end of pipe 31 is connected to a housing 37 containing a filter element 38 for filtering the treated exhaust gas. The filter 38 is arranged to completely fill the passage defined by housing 37 so as to ensure that all of the gas from pipe 31 will pass therethrough.

Filter 38 may be of the aspirator type and can be made of urethane foam or polyfoam. However, it is preferred that the filter be provided with a chemical treatment mass composed of a portion 39 composed of a loosely packed mass of nut charcoal within which is disposed potassium permanganate and a portion 40 made of a loosely packed mass of nut charcoal.

Connected to the outlet end of housing 37 is a burner chamber 36 having two compartments each provided with a respective glow plug mounted in an insulating support so as to be electrically insulated from the chamber walls. The glow plugs can be connected to the vehicle electrical system.

At the outlet end of chamber 36 there is provided a tube 41 whose outlet end is connected to a closed chamber 45 built into the engine air intake filter 43 delivering air to the engine carburetor. Tube 41 is connected to feed all of the filtered gas passing therethrough into the chamber 45, where it preheats the air being drawn into the engine carburetor, while itself being further cooled and then passing into the atmosphere via outlet 46.

The engine air intake filter 43 is shown in plan view with its cover removed for illustrative purposes. The chamber 45 is especially built into the filter housing and is closed off from the interior of that housing. In all other rsepects filter 43 is of standard construction and includes an air intake nozzle 42, an air filter element 48 and a carburetor air inlet 49.

The apparatus according to the present invention is placed into operation automatically whenever the engine of the automotive vehicle with which it is associated is started. The pumps 10 and 12 are connected to operate whenever the engine is running, and may be driven directly by the engine, for example, by being directly connected to the engine fan belt.

With both the vehicle engine and the pumps operating, exhaust gas from the engine exhaust manifold is conducted via pipe 22 into container 1. From there, the gas circulates through the interior of the chamber and into the outlet pipe 31, as indicated by the arrows. At the same time, the liquid coolant is circulated by the pump 12 through pipe 19 into chamber 6, through the lower group of pipes 5, through chamber 8, back through the upper group of pipes, through chamber 7 through device 16, and back to pump 12. The circulating coolant serves only to prevent tubes 5 from reaching a temperature at which they would experience unduly rapid deterioration.

The liquid coolant circulates in the direction indicated by the arrows. At the same time nozzle 9 introduces a jet of air into the exhaust gas in container 1. This air jet acts to impart a whirlpool movement to the exhaust gas and thus to increase its turbulence.

The exhaust gas introduced into reactor 1 via pipe 22 encounters tubes 5 which serve to break up the gas flow into a plurality of individual flows following different paths and to impart a substantial degree of turbulence to the gas as it flows between the pipes 22 and 31. The gas enters the reactor at a relatively high temperature, generally of the order of 1600° F., so that when it mixes with the air jet introduced via nozzle 9, a combustion reaction occurs between the air and both the carbon monoxide and the unburned hydrocarbons coming from the exhaust manifold. I have found that the turbulent movement imparted to the gas by the tubes 5 serves to substantially increase its mixing with the air and thus to improve the degree to which combustible products, and particularly unburned hydrocarbons, from the exhaust manifold are burned. In addition, surprisingly, the turbulent movement of the exhaust gas through the reactor has been found to reduce the back pressure on the exhaust manifold and thus to improve both the quietness and smoothness of operation of the vehicle engine.

In order to produce complete combustion within reactor 1 it is desirable for a relatively constant exhaust gas-air ratio to be maintained. This is achieved automatically in the apparatus according to the invention due to the fact that the pump delivering air to the nozzle 9 is driven by the vehicle engine itself. As a result, the amount of air introduced into reactor 1 will always be proportional to the speed of the engine and hence generally proportional to the amount of exhaust gas being produced.

A suitable rate of air flow has been achieved by utilizing a pump of the type normally employed in automobile air conditioning systems, the pump currently used for Ford air conditioners having been used in practice, by employing a one-quarter inch diameter tube for line 11, and by giving the nozzle 9 an orifice having a diameter of one-sixteenth of an inch. Correspondingly, in the operating device which has been constructed and has been in actual use tubes 5 are constituted by one-half inch diameter copper tubes, while tubes 22 and 31 are two inches in diameter. The reactor chamber of the working model has an overall length of twenty-nine inches and a length of twenty-inches between walls 2 and 3. The reactor chamber has a generally elliptical cross section, as shown in FIG. 2 of the drawings, the cross section having a major axis of nine inches and a minor axis of three inches. This device employs a total of eight tubes 5 divided into two groups, as is also illustrated in FIG. 2. This relationship between the dimensions of the reactor, the tubes, and the air delivery system has been found to produce a highly efficient combustion reaction.

The resulting gas leaves the reactor via tube 31 and passes through filter 38 where combustion products, and particularly carbon monoxide, are filtered out. The filter 38 is preferably separated from the reactor 31 by a substantial length of tube so as to permit the gas to cool before reaching the filter. The contraction of the gas as it cools while traversing tube 31 helps to prevent any pressure build-up at the filter 38 and to increase the efficiency of the filtering action. In addition, since the filter portions 39 and 40 are both composed of loosely packed charcoal, the filter will not offer any great resistance to the flow of gas.

Then the gas encounters burner chamber 36 containing two glow plugs connected through suitable circuitry to the vehicle battery. The heat generated by the two plugs acts to produce a high temperature to burn products which escaped previous treatment. Chamber 36 is in fact provided only as a safety measure because substantially all noxious products will be burned in reactor 1, if it is operating normally, and filtered by filter 37. Thus, the gaseous products reaching tube 41 will be completely free of harmful ingredients. This gas is delivered into chamber 45 where it is cooled by, and preheats, air being drawn into filter 43 for delivery to the engine carburetor. The now harmless exhaust gas can exit to the atomsphere via outlet 46.

During the passage of the exhaust gas through the apparatus, it is sufficiently cooled so that the gas leaving 46 is only slightly warmer than the air being drawn outlet into the engine carburetor.

As has been mentioned above, the purpose of tubes 5 is to impart a turbulent motion to the exhaust gas passing through the reactor. I have found that such tubes are well suited for this purpose since they impart the requisite degree of turbulence without exerting such a high resistance to gas flow as to increase the back pressure on the exhaust manifold. Baffles of the more common type would be likely to create such a back pressure increase. The tubes 5 are preferably made of copper because this material is easy to machine and is both inexpensive and light in weight. However, because such material would be subjected to deterioration at the high temperature existing in the manifold, I have found it desirable to provide a continuous but small flow of cooling fluid through the pipes. In order to compensate for the relatively high temperature of the cooling liquid leaving the reactor, and to optimize the performance of the entire system. I have also found it desirable to replace the normal 16 pound pressure cap provided on the radiator by a 4 pound pressure cap. In addition, the operation of the system is improved if the cooling system is provided with a 160° F. thermostat. I have found that when such elements are employed, the exhaust control system according to the invention, and the vehicle engine and cooling system, operate efficiently, smoothly and dependably.

Although the precise reactions occuring in the apparatus of the present invention are not yet known with perfect certaintly, it is believed that the monoxide components are converted into a carbon oxide, possibly carbon dioxide, by burner 36, and some carbon products, possibly in the form of solids suspended in the exhaust gas, are trapped by filter 37.

The exhaust gas treatment apparatus according to the present invention prevents any harmful exhaust gas products whatsoever from being expelled to the atmosphere. As a result, vehicles equipped with this system will contribute substantially no pollution products to the atmosphere.

In addition, the system is capable of operating for long periods of time without requiring any maintenance other than the occasional periodic replacement of filter 38. To facilitate this servicing, housing 37 may be provivided with a removable lid 37' which is attached to housing 37 in a readily detachable manner by means of hinge bolts and the tube connected to lid 37' may be made flexible to permit the lid 37' to be easily removed from housing 37 for replacement of the filter 38. Alternatively, the tube 41 could be made flexible and the chamber 36 mounted to be lifted with lid 37' for changing the filter element. It has been found in practice that the filter need be replaced only at 1400-mile intervals.

The treatment apparatus according to the present invention offers several substantial advantages in addition to preventing air pollution. Particularly, it has been found that vehicles equipped with a system according to the present invention run far more quietly than vehicles equipped with conventional muffler tail pipe assemblies, due in large measure to the low back pressure created by the novel apparatus. Moreover, the system according to the present invention completely eliminates the need for any tail pipe.

It will be understood that the above description of the present invention is susceptible to various modifications, changes and adaptations.

I claim:

1. An exhaust gas treatment system for an automotive vehicle having an engine exhaust manifold, said system comprising:
   (a) reactor means defining a gas treatment region and having a gas inlet connectable to the exhaust manifold, and a gas outlet;
   (b) gas deflector means constituted by a plurality of tubes disposed in, and extending the length of, said gas treatment region for imparting a turbulent movement to the exhaust gas entering said reactor means via said gas inlet means;
   (c) air delivery means connected to said reactor means for delivering air into the gas treatment region, whereby the air combines with the exhaust gas to burn carbon monoxide and unburned hydrocarbons;
   (d) filter means connected to said gas outlet for filtering combustion products out of the gas leaving said reactor means;
   (e) conduit means connected to said filter means for conducting all residual gas to the atmosphere; and
   (f) means connected between said tubes and the cooling system of the engine for producing a continuous circulation of cooling fluid through said tubes.

2. An arrangement as defined in claim 1 further comprising auxiliary burner means containing at least one glow plug and connected in said conduit means for burning any previously unburned products in the exhaust.

3. An arrangement as defined in claim 1 further comprising a housing containing said filter means and mounted on the inlet end of said means, said housing having a lid which is detachable for permitting replacement of said filter means.

4. An arrangement as defined in claim 1 wherein said conduit means are disposed for bringing the gas passing therethrough into heat exchange relation with air being drawn into the carburetor air intake filter of such vehicle.

5. An arrangement as defined in claim 1 wherein said air delivery means includes an air delivery pump connected to be driven by the engine of such vehicle and an air jet nozzle connected to receive air delivered by said pump and having its outlet orifice disposed within said gas treatment region.

6. An arrangement as defined in claim 1 wherein said filter means includes a removable filter element composed of potassium permanganate and loosely packed charcoal.

References Cited
UNITED STATES PATENTS

| | | | |
|---|---|---|---|
| 1,716,479 | 6/1929 | Bilsky | 60—29 |
| 1,756,897 | 4/1930 | Bilsky | 60—29 |
| 1,843,999 | 2/1932 | White | 60—30 |
| 1,877,523 | 9/1932 | Gordon | 60—30 |
| 3,032,967 | 5/1962 | Dosie | 60—30 |
| 3,059,422 | 10/1962 | White | 60—30 |
| 3,146,072 | 8/1964 | Morgan | 60—30 |
| 3,177,650 | 4/1965 | Caruso | 60—30 |
| 3,347,217 | 10/1967 | Giorgio. | |
| 3,350,878 | 11/1967 | Lambert | 60—30 |

DOUGLAS HART, Primary Examiner

U.S. Cl. X.R.

123—122